Oct. 16, 1951  F. F. BICKEL ET AL  2,571,105
COMBINATION PUMP AND POWER TAKE-OFF
Filed Oct. 7, 1948  2 Sheets-Sheet 1
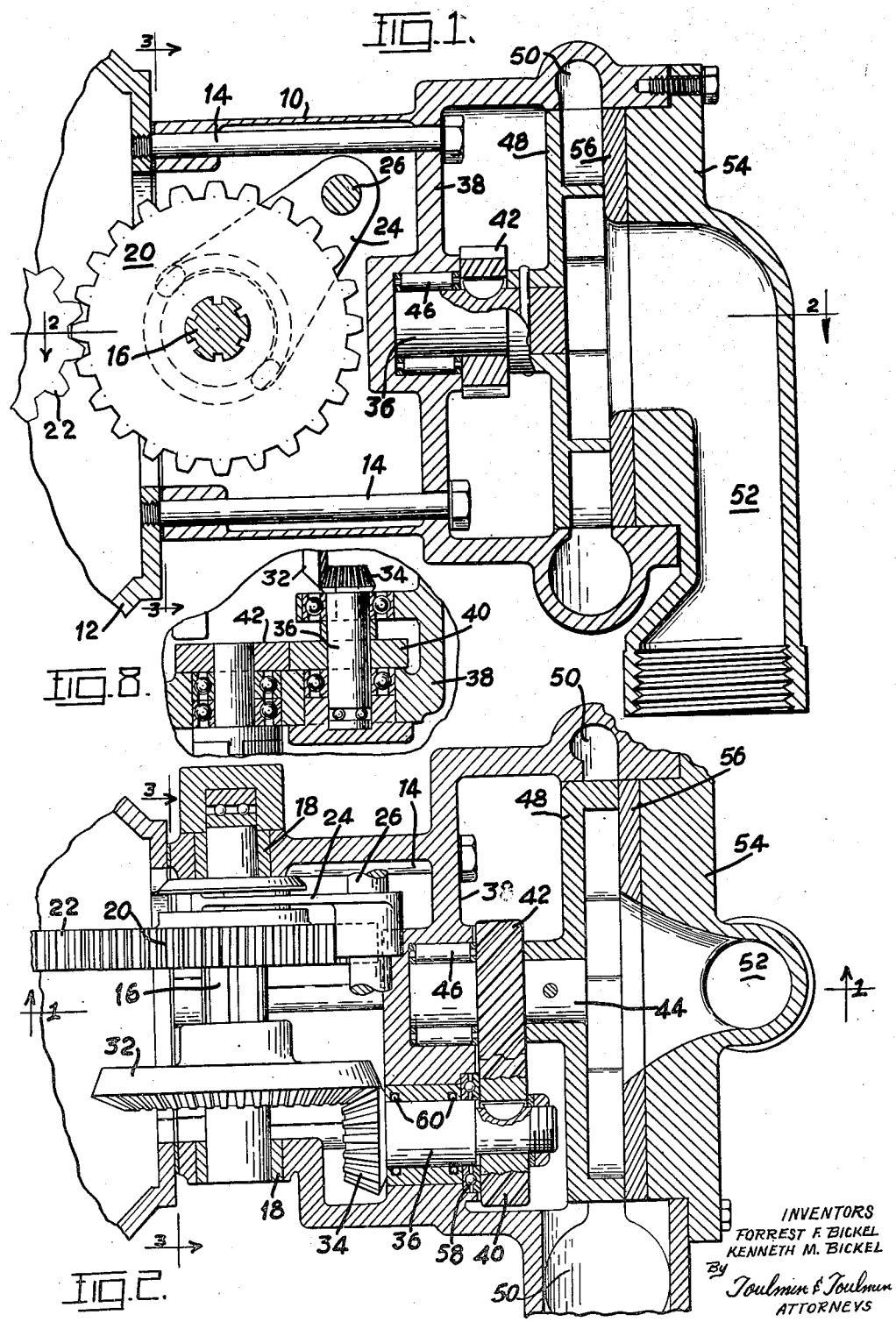
INVENTORS
FORREST F. BICKEL
KENNETH M. BICKEL
By Toulmin & Toulmin
ATTORNEYS

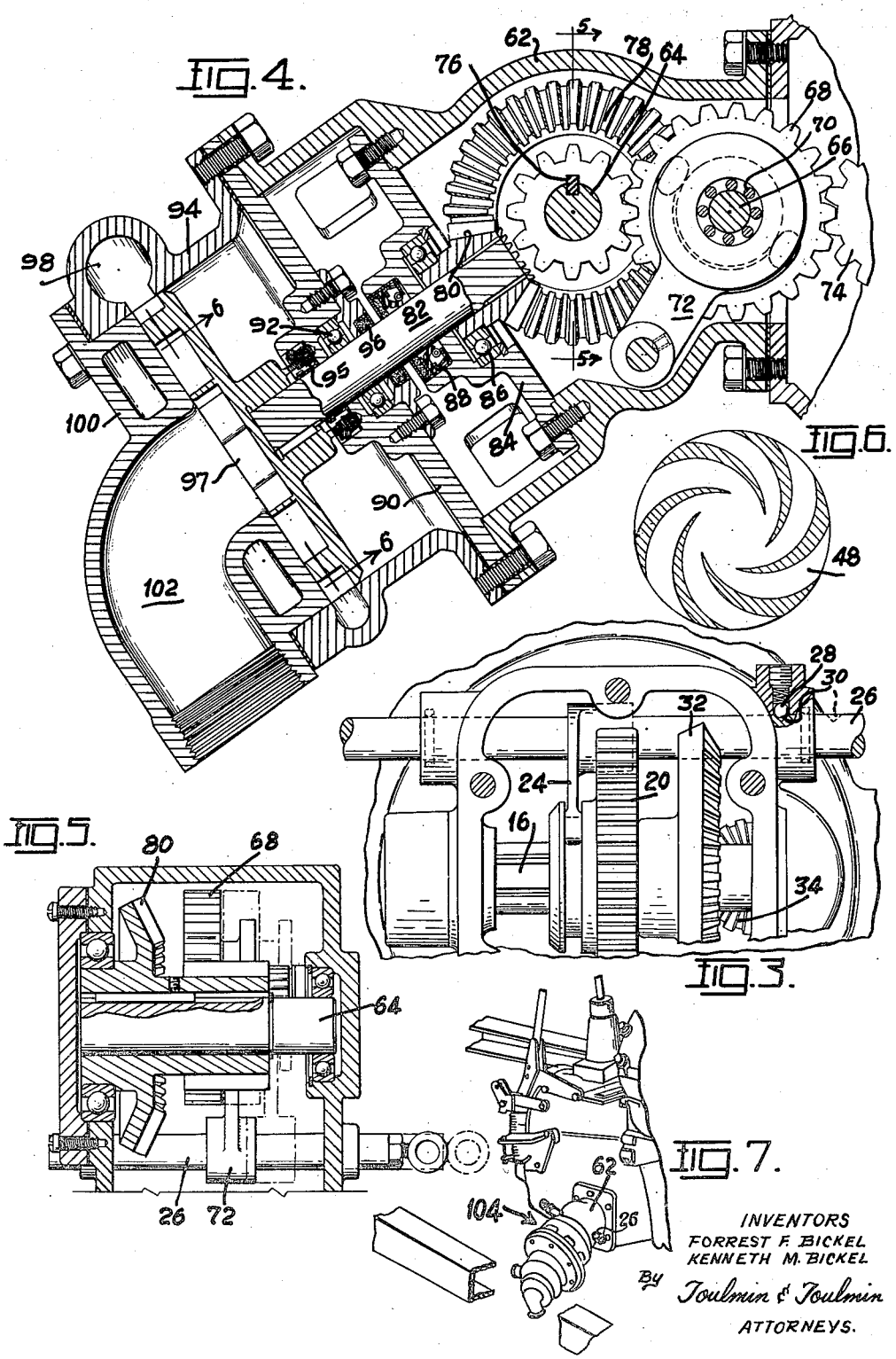

Patented Oct. 16, 1951

2,571,105

UNITED STATES PATENT OFFICE 2,571,105

COMBINATION PUMP AND POWER TAKE-OFF

Forrest F. Bickel and Kenneth M. Bickel, Farmersville, Ohio

Application October 7, 1948, Serial No. 53,238

13 Claims. (Cl. 103—87)

This invention relates to power take-offs and pumps, and in particular, to an improved combined power take-off and pump especially adapted for mounting on the transmission of a vehicle, such as a truck, to be driven thereby.

In connection with many vehicles, especially dump trucks and the like, it is necessary to have a source of hydraulic pressure available for actuating the hydraulically operated auxiliaries of the vehicle. The present invention is primarily concerned with the provision of a greatly improved pumping device and drive therefor of this nature.

One of the particular objects of this invention is to provide a combined pump and power take-off unit for driving the said pump and which combination construction will be very compact.

A still further object is the provision of a pump and drive for the said pump in which the pump can be serviced at any time without interfering with the drive unit therefor.

It is also an object of this invention to provide a combined power take-off and pump driven thereby which can be mounted on the transmission of a truck and in which it is possible to entirely disassemble the pumping elements without removing the unit from the transmission or without entailing any loss of lubricant from the power take-off or the pump.

The particular use for which the unit of this invention has been devised is in connection with tank trucks or fluid carriers which are used for transporting oils and fluids. These trucks are usually equipped with a pumping unit adjacent to the rear end thereof and which is driven by means of a shaft extending from the pumping unit to the power take-off on the truck transmission. Due to the long length of shaft considerable trouble is experienced with this type of pumping arrangement. The shaft has a tendency to whip and will, on occasion, actually twist off. It is, accordingly, a still further object of this invention to provide a combined pumping unit for power take-off especially adapted for use in connection with tank trucks and similar fluid carriers.

These and other objects and advantages will become more apparent upon reference to the following description taken in connection with the accompanying drawings in which:

Figure 1 is a vertical section through a unit constructed according to this invention and is indicated by line 1—1 on Figure 2.

Figure 2 is a plan section through the device and is indicated by line 2—2 on Figure 1.

Figure 3 is an end view looking in to the power take-off end of the unit and is indicated by lines 3—3 on Figures 1 and 2.

Figure 4 is a vertical section similar to Figure 1 but showing a modified form which the unit of this invention may take.

Figure 5 is a fragmentary vertical section indicated by line 5—5 on Figure 4.

Figure 6 is a vertical sectional view taken through one of the impellers of the pumping units and may be indicated by line 6—6 on Figure 4.

Figure 7 is a fragmentary perspective view of the manner of mounting one of the units of this invention on the transmission of a truck or tractor.

Figure 8 is a fragmentary view showing a modified arrangement of the drive illustrated in Figures 1 and 2 wherein all of the gears of the drive are on one side of the partition member extending through the housing.

Referring to the drawings more in detail, the device illustrated in the Figures 1 through 3 comprises a housing part 10 which is adapted for being secured to the transmission housing 12 of a truck or tractor as by means of the bolts or cap screws 14. A gasket is preferably provided between the housings in order to prevent leakage of the lubricant therefrom.

Extending transversely through the housing 10 adjacent its abutment with housing 12 is a shaft 16 which is rotatable on the bearings 18 as best seen in Figure 2. Slideably splined to the shaft 16 is a spur gear 20 which is of a size to extend into the transmission housing 12 and to mesh with one of the gears 22 therein. Gear 20 includes a hub at one side in which there is an annular groove and into which extends a shifting fork 24. The shifting fork 24 is for the purpose of sliding the gear 20 into and out of engagement with the gear 22 and is mounted on the shifting rod 26 that extends through the housing 10 as best illustrated in Figure 3. The two operative positions of the gear 20 and the shifting mechanism therefor may be determined by the spring pressed ball detent 28 and the recesses 30 as shown in Figure 3.

Also secured to the shaft 16 is a bevel gear 32 which meshes with another and smaller bevel gear 34. Gear 34 is mounted on a shaft 36 that extends through a partition wall 38 in the housing 10. On the end of the shaft 36 opposite the gear 34 is a helical or skew gear 40. The gear 40 meshes with a corresponding helical gear 42 on a shaft 44 which is cantilevered from the partition wall 38 by means of the roller bearing 46. The outer end of the shaft 44 mounts a pump impeller 48 which may be of the centrifugal type as illustrated in Figure 6.

The compartment within which the impeller 48 is positioned has a discharge channel 50 surrounding the impeller 48 and into which the said impeller discharges. Fluid is supplied to the impeller 48 through an inlet passage 52 which extends through a closure plate 54 mounted on the end of the housing 10 where, interposed between the closure plate 54 and the impeller 48 is a wear plate 56. The thrust of rotation of the gears 40 and 42 is such that the impeller 48 is thrust toward the wear plate 56 while the gear 40 is thrust toward the partition member 38. To absorb the last-mentioned thrust, a thrust bearing 58 is placed between gear 40 and partition 38.

It will be observed that the housing 10 is divided into two chambers or compartments by the partition 38. The one compartment includes the power take-off mechanism, while the other compartment includes the pumping mechanism. These parts are interconnected by shaft 36 extending through the partition wall and in order completely to isolate the compartments, sealing means as indicated at 60 may be included in the bearing which journals shaft 36 in the partition 38.

It will also be noted that by removing the closure 54, the wear plate 56, the pump impeller 48 and gear 42 and shaft 44 can readily be removed from the pumping compartment, and that this does not expose any parts of the power take-off except the gear 40. It is thus possible to service the pump at any time it may become necessary without removing the device from its position on the transmission of a truck or tractor. This is of distinct advantage because with units of this nature, it is generally the pump part which requires servicing rather than the power take-off part.

It will also be noted that the entire assembly is very compact and thus occupies a minimum amount of space and can readily be mounted between the side wall of the truck or tractor transmission and the adjacent part of the chassis of the vehicle.

In Figure 8 it will be noted that the arrangement is such that the gears 40 and 42 are on the same side of the partition 38 as the others of the gears in the drive. This arrangement is of advantage in that the said gears will never be without lubricant and thus all chance that they will become burnt up, scored, or that they will strike sparks from running dry is completely eliminated.

A modified arrangement of this invention is illustrated in Figures 4 and 5. In this modification, substantially the same operative elements are employed, but they are arranged in a somewhat different manner. Referring to these figures, the unit comprises a first housing part 62 which is mounted on the side of the transmission and within which there are a pair of spaced transversally extending shafts 64 and 66. Shaft 66 freely rotatably supports a spur gear 68 as by means of the roller bearing arrangement at 70. The gear 68 is slideable axially of the shaft by a shifting fork mechanism 72 into and out of engagement with the transmission gear 74.

Keyed to the shaft 64 as by means of the key 76 is a combination bevel-spur gear 78, the spur gear portion of which is continuously in mesh with the gear 68 and the bevel gear portion is continuously in mesh with the bevel gear 80 on the shaft 82.

The end of the housing 62 opposite its connection with the transmission is recessed and there is a bearing plate 84 mounted at the base of the recess and which carries the bearing 86 for journalling the bevel gear 80. This plate also includes an oil seal 88 surrounding shaft 82 and effective for preventing loss of lubricant from the housing 62.

Extending across the outer part of the aforementioned recess is another plate 90 which includes a bearing 92 for journaling the shaft 82 and the sealing members 95 and 96.

Also secured to the recessed end of the housing 62 is member 94 which forms a compartment for the pump impeller 97. Similarly as with the pumping compartment portion of the housing 10 of the first modification, the member 94 has an annular fluid passage 98 therein, into which the impeller 97 discharges fluid. Also the member 94 is closed by a closure plate 100 which is bolted thereto and which includes the inlet passage 102 for supplying fluid to the center of the impeller 97.

It will be noted that the closure plate 100 can be removed from the member 94 and the pump impeller 97 removed from the shaft 82 without in any way disturbing the power take-off portion of the unit and without entailing any loss of lubricant therefrom. While the unit illustrated in Figures 4 and 5 is of somewhat greater length than that illustrated in Figures 1 and 2, it will be noted that it is still very compact and readily adapted for mounting on the side of a transmission as indicated at 104 in Figure 7. Furthermore, due to the angular configuration of the housing, the pump end of the unit is so positioned that access can readily be had thereto for servicing, replacement of parts, or the connecting of hydraulic lines thereto.

It will be seen from the foregoing that this invention provides for a combination pump and power take-off unit arranged in a novel and compact manner and having definite advantages in the isolation of the two parts of the unit which leads to easy servicing thereof.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

We claim:

1. In a power unit, a generally tubular housing with partition means intermediate its ends, a shaft journaled on a transverse axis adjacent one end of said housing and a gear thereon extending through the said one end, a second shaft extending axially of said housing through said partition and connected to be driven by said gear, and pumping means detachably mounted in the other end of said housing and detachably drivingly connected with said second shaft, said pumping means including a rotary impeller and closure means mounted on the end of the housing and bearing on the face of the impeller.

2. In a power unit, a generally tubular housing having a partition dividing it into two chambers, a shaft transversely journaled in said housing adjacent one end thereof and having a gear slidable thereon and extending through the said one end, a second shaft extending axially through said partition and journaled thereon, means for driving said second shaft from said gear, a pump impeller closely fitting said housing adjacent the other end thereof from said gear, means to drive said impeller by said second shaft, and means including a closure plate closing the said other end of said housing and bearing across the face of said impeller.

3. In a power unit, a generally tubular housing having a partition dividing it into two chambers, a shaft transversely journaled in said housing adjacent one end thereof and having a gear slidable thereon and extending through the said one end, a second shaft extending axially through said partition and journaled thereon, means for driving said second shaft from said gear, a pump impeller closely fitting said housing adjacent the other end thereof from said gear, means to drive said impeller by said second shaft, and closure means closing the said other end of said housing and bearing across the face of said impeller and including a closure plate secured to the housing, there being fluid passages in said plate closure means and said housing opening into said impeller.

4. In a power unit, a generally tubular housing having a partition dividing it into two chambers, a shaft transversely journaled in said housing adjacent one end thereof and having a gear slidable thereon and extending through the said one end, a second shaft extending axially through said partition and journaled thereon, means for driving said second shaft from said gear, including bevel gears, a pump impeller closely fitting said housing adjacent the other end thereof from said gear, means to drive said impeller by said second shaft, and closure means closing the said other end of said housing and bearing across the face of said impeller.

5. In a power unit, a generally tubular housing having a partition dividing it into two chambers, a shaft transversely journaled in said housing adjacent one end thereof and having a gear slidable thereon and extending through the said one end, a second shaft extending axially through said partition and journaled thereon, means for driving said second shaft from said gear, including bevel gears, a pump impeller closely fitting said housing adjacent the other end thereof from said gear, means to drive said impeller by said second shaft, closure means closing the said other end of said housing and bearing across the face of said impeller, and means for shifting said gear on its supporting shaft between driving and idling positions.

6. In a fluid power unit, a housing having a chamber in one end, a rotary impeller closely fitting in the open end of said chamber, a shaft supporting said impeller and journaled in the wall at the closed end of said chamber, a closure member mounted on the open end of said chamber, a wear plate closely fitting between said member and the face of said impeller, and means for simultaneously driving said impeller and urging it toward said plate comprising a first skew gear on said shaft and a second skew gear meshing therewith and driven by means extending through said wall.

7. In a power unit adapted for mounting on the geared transmission of a truck or the like; a housing having a recess in one end, partition members secured to said housing at the bottom and face of said recess, a shaft extending through and journaled in said members, a pumping unit secured to the face of said recess and including an impeller detachably connected with said shaft, a bevel gear on the end of said shaft opposite the connection thereof with said impeller, a second shaft extending transversely of said housing and suporting a second bevel gear meshing with the first mentioned bevel gear, a third shaft extending transversely of said housing and having a sliding gear thereon extending beyond the end of the housing, and a pinion meshing with said sliding gear and connected with said second bevel gear.

8. In a power unit adapted for mounting on the geared transmission of a truck or the like; a housing having a recess in one end, partition members secured to said housing at the bottom and face of said recess, a shaft extending through and journaled in said members, a pumping unit secured to the face of said recess and including an impeller detachably connected with said shaft, a bevel gear on the end of said shaft opposite the connection thereof with said impeller, a second shaft extending transversely of said housing and supporting a second bevel gear meshing with the first mentioned bevel gear, a third shaft extending transversely of said housing and having a sliding gear thereon extending beyond the end of the housing, and a pinion meshing with said sliding gear and connected with said second bevel gear, said housing having a mounting flange extending around the sliding gear in a plane oblique to the axis of the shaft extending through said partition members whereby the unit can be mounted on the transmission of a truck or the like with the pump end of the unit extending downwardly at an angle to the horizontal so as to be easily accessible for being serviced from beneath the truck.

9. In a power unit, a hollow tubular housing having a partition between its ends, a pump impeller in one end of said housing, a recess in said partition and a bearing therein, a shaft on the impeller slidably and rotatably fitting in said bearing, a closure plate mounted on and closing the said one end of the housing and serving to retain said impeller and shaft in operative position in said housing, a wear plate between the impeller and closure plate, a skew gear on the shaft between the bearing and impeller and a second skew gear meshing therewith, and means extending through said partition in sealing relation therewith connected with said second skew gear for driving it in a direction to urge said impeller toward said wear plate.

10. In a power unit, a hollow tubular housing having a partition between its ends, a pump impeller in one end of said housing, a recess in said partition and a bearing therein, a shaft on the impeller slidably and rotatably fitting in said bearing, a closure plate mounted on and closing the said one end of the housing and serving to retain said impeller and shaft in operative position in said housing, a wear plate between the impeller and closure plate, a skew gear on the shaft between the bearing and impeller and a second skew gear meshing therewith, and means extending through said partition in sealing relation therewith connected with said second skew gear for driving it in a direction to urge said impeller toward said wear plate, said wear plate and said closure plate being centrally apertured to provide a fluid inlet for said impeller.

11. In a power unit, a hollow tubular housing having a partition between its ends, a pump impeller in one end of said housing, a recess in said partition and a bearing therein, a shaft on the impeller slidably and rotatably fitting in said bearing, a closure plate mounted on and closing the said one end of the housing and serving to retain said impeller and shaft in operative position in said housing, a wear plate between the impeller and closure plate, a skew gear on the shaft between the bearing and impeller and a second skew gear meshing therewith, and means extending through said partition in sealing relation therewith connected with said second skew gear for driving it in a direction to urge said impeller toward said wear plate, said wear plate and said closure plate being centrally apertured to provide a fluid inlet for said impeller, and said housing having an annular passage thereabout opening into the periphery of said impeller to provide a fluid outlet therefore.

12. In a power unit, a generally cylindrical hollow housing with a partition between its ends and having one end adapted for being mounted on the side of a geared transmission, a pump mounted in the other end of said housing detachable from the housing by axial movement of the pump toward the said other end of the housing, a drive connected with said pump extending through said housing and out the said one end thereof to transmit power from one of the gears of the transmission to the pump, said drive being detachable from said pump upon the said axial movement of the pump, said drive including a rotary shaft extending through said partition in sealing relation therewith, and a closure plate detachably mounted over the said other end of said housing and forming the sole means for maintaining said pump in said housing.

13. In a power unit, a housing having a chamber at one end thereof, an impeller closely fitting in the open end of said chamber, a shaft connected with said impeller and extending toward the closed end of said chamber, a bearing in the wall at the closed end of the chamber slidably and rotatably receiving the end of said shaft, closure means closing the open end of said chamber and bearing on the face of said impeller and including a closure plate detachably secured to the open end of said chamber, said impeller and shaft being retained in operative position in said chamber by said closure plate, and driving means extending into said chamber through the closed end thereof connected with said shaft and operable to drive said impeller and to urge it toward said closure means.

FORREST F. BICKEL.
KENNETH M. BICKEL.

REFERENCES CITED

The following references are of record in the file of this patent:

UNITED STATES PATENTS

| Number | Name | Date |
|---|---|---|
| 1,324,079 | Snell et al. | Dec. 9, 1919 |
| 1,513,659 | Wardwell | Oct. 28, 1924 |

FOREIGN PATENTS

| Number | Country | Date |
|---|---|---|
| 273,053 | Great Britain | June 30, 1927 |
| 548,209 | France | Jan. 10, 1923 |